（12）United States Patent
Moriya et al.

(10) Patent No.: US 7,965,919 B2
(45) Date of Patent: Jun. 21, 2011

(54) CONTENTS RECORDING SYSTEM AND CONTENTS RECORDING METHOD

(75) Inventors: Takuji Moriya, Kanagawa (JP); Takeharu Hino, Kanagawa (JP); Katsuyuki Fujihata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1468 days.

(21) Appl. No.: 11/404,622

(22) Filed: Apr. 14, 2006

(65) Prior Publication Data

US 2006/0245721 A1 Nov. 2, 2006

(30) Foreign Application Priority Data

Apr. 15, 2005 (JP) .................................. 2005-118396

(51) Int. Cl.
*H04N 5/77* (2006.01)
*H04N 5/931* (2006.01)
*H04N 5/932* (2006.01)

(52) U.S. Cl. ........................................ 386/224; 386/210

(58) Field of Classification Search ..................... None
See application file for complete search history.

(56) References Cited

U.S. PATENT DOCUMENTS

| 5,930,446 | A | 7/1999 | Kanda |
| 6,456,321 | B1 | 9/2002 | Ito et al. |
| 7,272,298 | B1 | 9/2007 | Lang et al. |
| 2003/0007785 | A1* | 1/2003 | Shimizu ........................ 386/117 |
| 2003/0177503 | A1 | 9/2003 | Sull et al. |
| 2005/0008327 | A1 | 1/2005 | Shinkai |
| 2005/0166230 | A1 | 7/2005 | Gaydou et al. |
| 2006/0233526 | A1 | 10/2006 | Fujihata et al. |
| 2006/0233529 | A1 | 10/2006 | Moriya et al. |
| 2006/0245733 | A1 | 11/2006 | Hino et al. |

FOREIGN PATENT DOCUMENTS

JP 2003 299011 10/2003

* cited by examiner

*Primary Examiner* — Peter-Anthony Pappas
*Assistant Examiner* — Gelek Topgyal
(74) *Attorney, Agent, or Firm* — Frommer Lawrence & Haug LLP; William S. Frommer; Ellen Marcie Emas (57) ABSTRACT

A contents recording system and a contents recording method reducing a time taken for recording and editing of video content and other video contents and enabling editing of the video contents with a high reliability. An optical disk device for recording video content and a computer are connected via a network. The computer is supplied with clip data of the video and low resolution proxy AV data from the optical disk device, streaming reproduces them as live video and, at the same time, introduces essence marks as meta-data to any positions of the proxy AV data, and describes them in a meta-data file. When a communication abnormality occurs between the optical disk device and the computer, the clip data is notified to the computer again.

6 Claims, 11 Drawing Sheets

| | |
|---|---|
| _RecStart | START POSITION OF RECORDING |
| _RecEnd | END POSITION OF RECORDING |
| _ShotMark1 | OPTIONAL POSITION 1 |
| _ShotMark2 | OPTIONAL POSITION 2 |
| _Cut | CUT POSITION |
| _Flash | FLASH POSITION |
| _FilterChange | POSITION WHERE LENS FILTER IS CHANGED |
| _ShutterSpeedChange | POSITION WHERE SHUTTER SPEED IS CHANGED |
| _GainChange | POSITION WHERE GAIN IS CHANGED |
| _WhiteBalanceChange | POSITION WHERE WHITE BALANCE IS CHANGED |
| _OverBrightness | POSITION WHERE VIDEO OUTPUT LEVEL EXCEEDS 100% |
| _OverAudioLimiter | POSITION WHERE AUDIO OUTPUT LEVEL EXCEEDS LIMIT VALUE |
| _In-XXX | CUT START POSITION OF CONTENTS |
| _Out-XXX | CUT END POSITION OF CONTENTS |

CONTENTS RECORDING SYSTEM AND CONTENTS RECORDING METHOD

CROSS REFERENCES TO RELATED APPLICATIONS

The present invention contains subject matter related to Japanese Patent Application No. 2005-118395 filed in the Japan Patent Office on Apr. 15, 2005, the entire contents of which being incorporated herein by reference.

BACKGROUND OF THE INVENTION

1. Field of Invention

The present invention relates to a contents recording system and a contents recording method for recording video content for broadcast use and other video contents, more particularly relates to a technique for linking a desired position of video contents of a recorded object and index information for editing.

2. Description of the Art

In recent years, the increase in recording capacities and the improvement of data transfer speeds have made it possible to use optical disks as recording media of video cameras for industrial broadcast use. For example, the recording capacity of a optical disk on which video and audio data is recorded by a blue violet light emitting diode is as high as about 23 GB by the single side, single layer recording method. Further, the transfer speed (recording bit rate) of the data, although differing according to the compression ratio, is as high as 50 Mbps or more.

When using such an optical disk and industrial broadcast use video camera to capture desired video content, as disclosed in for example U.S. Published Patent Application No. 2005/0008327, the practice is to generate from the captured video not only video data compressed by a relatively low compression ratio so as not to cause deterioration etc. of the image quality (main video data), but also proxy video data compressed with a higher compression ratio than that video data (low resolution video data) and record it on the optical disk.

Note that the captured audio is also stored by generating not only main audio data having a low compression ratio, but also high compression ratio proxy audio data according to need.

The proxy video data and the proxy audio data (hereinafter referred to as the "proxy AV data") are data for the recently generally practiced "nonlinear editing". It is fetched into a personal computer, then used as the contents for editing. This is because when using a personal computer etc. for nonlinear editing, its processing capability is insufficient, therefore the high bit rate main video data as explained above cannot be directly used as editing contents.

The editing carried out based on proxy video data in this way is sometimes called "proxy editing" (rough editing). This rough editing is carried out as simple editing on the shoot location etc. In rough editing work, there is for example work for recording the key positions of the recorded video and for entering comments at desired positions of the recorded video. For example, when a baseball game is the video content, in the rough editing, there is the work of recording the position where a home run was hit in the game (time code etc.) and entering comments with respect to that home run.

The U.S. Published Patent Application No. 2005/0008327 discloses "meta-data" as additional information for video data for later confirmation of key positions of the video.

The rough editing is mainly work on the location where the video content is captured. The results thereof are for example transmitted via a network to a system of the studio preparing the final broadcast data separate from main video and/or audio data (hereinafter simply referred to as the "AV data") delivered in the form recorded on an optical disk. Then, that studio edits the main video data based on the results of the proxy editing to prepare the final video data for broadcast use.

However, in the past, the rough editing work was carried out after finishing recording the video content by transferring the proxy AV data recorded on the optical disk to a personal computer and playing it back there. This is because the cameraman recording the video content is busy shooting, therefore cannot record key positions of the video while shooting. Accordingly, the shooting work and the rough editing work were sequentially carried out, so a very long time was taken.

SUMMARY OF THE INVENTION

In the present invention, it is therefore desirable to provide a contents recording system and a contents recording method reducing the time taken for the recording and editing of video content and other video contents. Further, it is desirable to enable editing of video contents with a high reliability.

According to the present invention, there is provided a contents recording system having a first processing part transmitting video contents and a second processing part receiving the video contents, wherein the first processing part is provided with a recording part recording video contents in parts of a start of recording to an end of recording and managing the video contents by unique contents IDs and a transmitting part starting transmission to the second processing part in the order of recording the video contents before the recording part ends the recording of one video contents, the second processing part is provided with a receiving part receiving the video contents from the first processing part together with the contents IDs, a display part displaying the received video contents, and an index information processing part introducing to a desired position of the video contents displayed on the display part index information serving as an index of that position of the video and recording that position and index information linked together, the second processing part receives the contents IDs again when a communication abnormality occurs between the transmitting part and the receiving part conditional on the communication being restored to normal and the recording part being in the middle of recording being detected.

Preferably, the transmitting part transmits the data to the second processing part in real time in the recording order. Due to this, the recording of the video contents by the contents recording part and the display of the video contents by the display part are carried out with an extremely small time difference.

Note that, "contents ID" is a concept including identification information such as unique codes, numerals, and marks for specifying the video contents.

According to the present invention, there is provided a contents recording method performed between a first processing system and a second processing system, including having the first processing system start recording of video contents linked with unique contents IDs and start transmission of the video contents to the second processing system in the order of recording before ending the recording of the video contents and having the second processing system receive the video contents together with the corresponding contents IDs, display the received video contents, introduce to a desired position of the video contents to be displayed index information serving as an index of that position of the video, detect whether the first processing system is in the middle of recording the video contents, and receive the contents ID again when a communication abnormality occurs between the transmitting part and the receiving part conditional on the communication being restored to normal and the recording part being in the middle of recording being detected.

According to the present invention, the recording of video content and other video contents and the recording linking the video at a desired position of the video contents and the index information are carried out parallel, therefore the time taken for the recording and editing can be reduced. A receiving side is able to specify video contents of subject to the process even after the occurrence of an abnormal communication when video contents are transmitted and received.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Below, a contents recording system 1 according to an embodiment of the present invention will be explained in the following order.

Overall Configuration of Contents Recording System 1
Configuration of Optical Disk Device 2
Configuration of Computer 3
GUI of Computer 3
Operation of Contents Recording System 1
   (1) Start of Network Connection to Video Display
   (2) Start of Recording
   (3) Input of Essence Mark EM
   (4) End of Recording
   (5) Communication Interruption Processing
Effects of Embodiment
[Overall Configuration of Contents Recording System 1]

The contents recording system 1 is a system for recording and/or rough editing video content (video contents) at for example the location of production of a broadcast program. The contents recording system 1 is a system enabling the input of essence marks etc. at desired positions of the video content (proxy AV data) and the generation of a meta-data file accompanied with that in parallel with the recording of the video content.

Note that in general, meta-data is higher data concerning certain data and functioning as an index for expressing content of various types of data. In the explanation of the present embodiment, the meta-data is time-series meta-data comprised by an essence mark, a unique material identifier (UMID: identifier of AV contents internationally standardized as SMPTE 330 M), and a frame count (or a time code) and is generated in both the optical disk device 2 and the computer 3. Further, according to need, non-time series meta-data is also generated.

The essence mark will be explained later.

Figure 1:
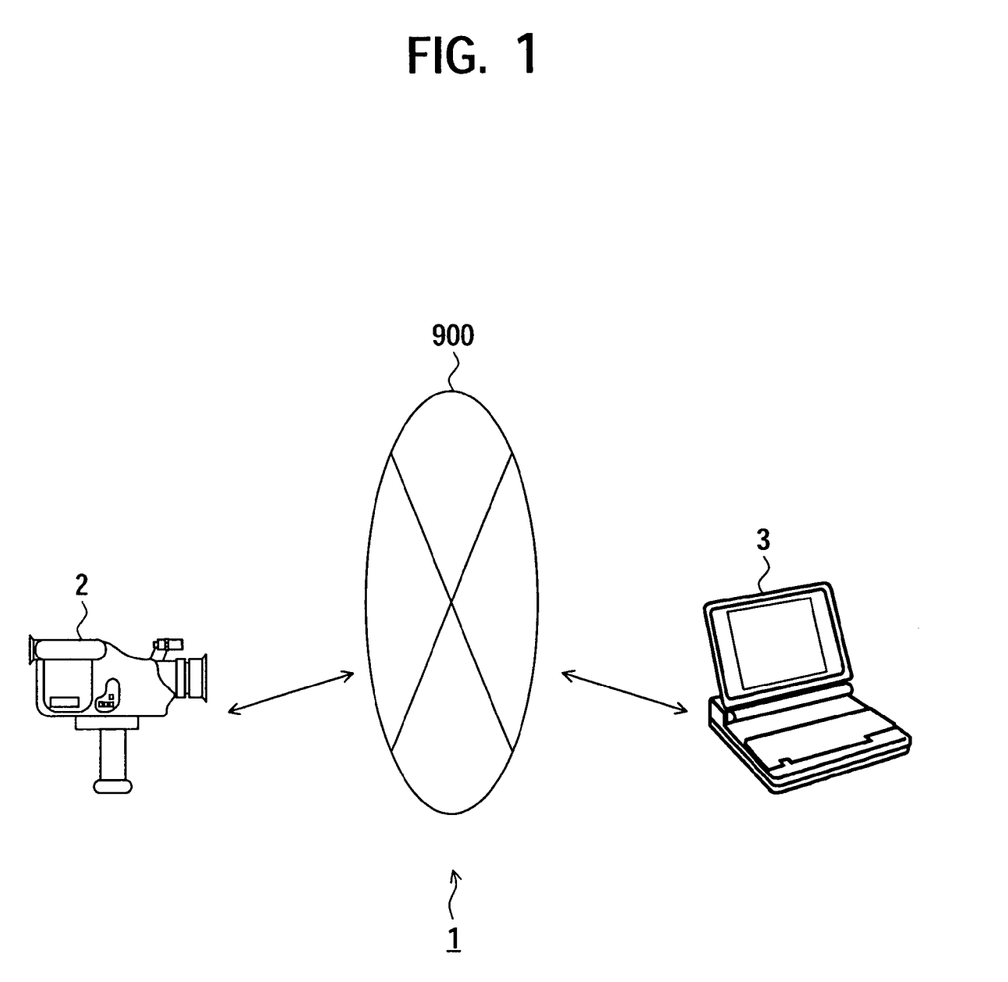
FIG. 1 is a diagram showing the overall configuration of a contents recording system according to an embodiment of the present invention.

FIG. 1 is a view showing the overall configuration of the contents recording system 1.

As shown in FIG. 1, the contents recording system 1 includes an optical disk device 2 for recording video content acquired by a camera means such as a video camera and a personal computer 3 (hereinafter referred to as the "computer 3") receiving the video content as proxy AV data via a network 900 and performing streaming reproduction and able to input index information for editing.

The transfer of AV data encoded with a high bit rate from the optical disk device 2 to the computer 3 and its processing there as is sometimes is difficult when considering the communication capacity and the processing capability of the computer 3. Therefore, in the present embodiment, low resolution proxy AV data is generated at the optical disk device 2 side and transmitted to the computer 3.

The computer 3 receives and reproduces (streaming reproduces) the proxy AV data and allows the input of essence marks to any positions of the proxy AV data.

Note that, in the contents recording system 1, the optical disk device 2 and the computer 3 are connected to the network 900 according to a predetermined Ethernet protocol.

In a preferred usage of the contents recording system 1, for example a user B different from a user A operating the optical disk device 2 operates the computer 3. In such usage, the user A can concentrate on the camera work, and the user B can input the index information necessary for the editing while monitoring the captured content in real time. Accordingly, the shooting work and the editing work can be simultaneously performed.

Next, the index information of the present invention, that is, the essence mark, will be briefly explained.

An essence mark indicates an index linked to a desired video scene (or cut) of the AV data acquired from the video content. By referring to the essence mark, even when not reproducing the AV data, a specific scene linked with the essence mark can be determined. This is convenient for editing.

In the contents recording system 1, the essence mark is previously defined as a reservation word. Accordingly, it is possible to handle the essence mark as common meta-data in the interface between the optical disk device 2 and the computer 3 without converting it in accordance with the opposing system.

Figure 2:
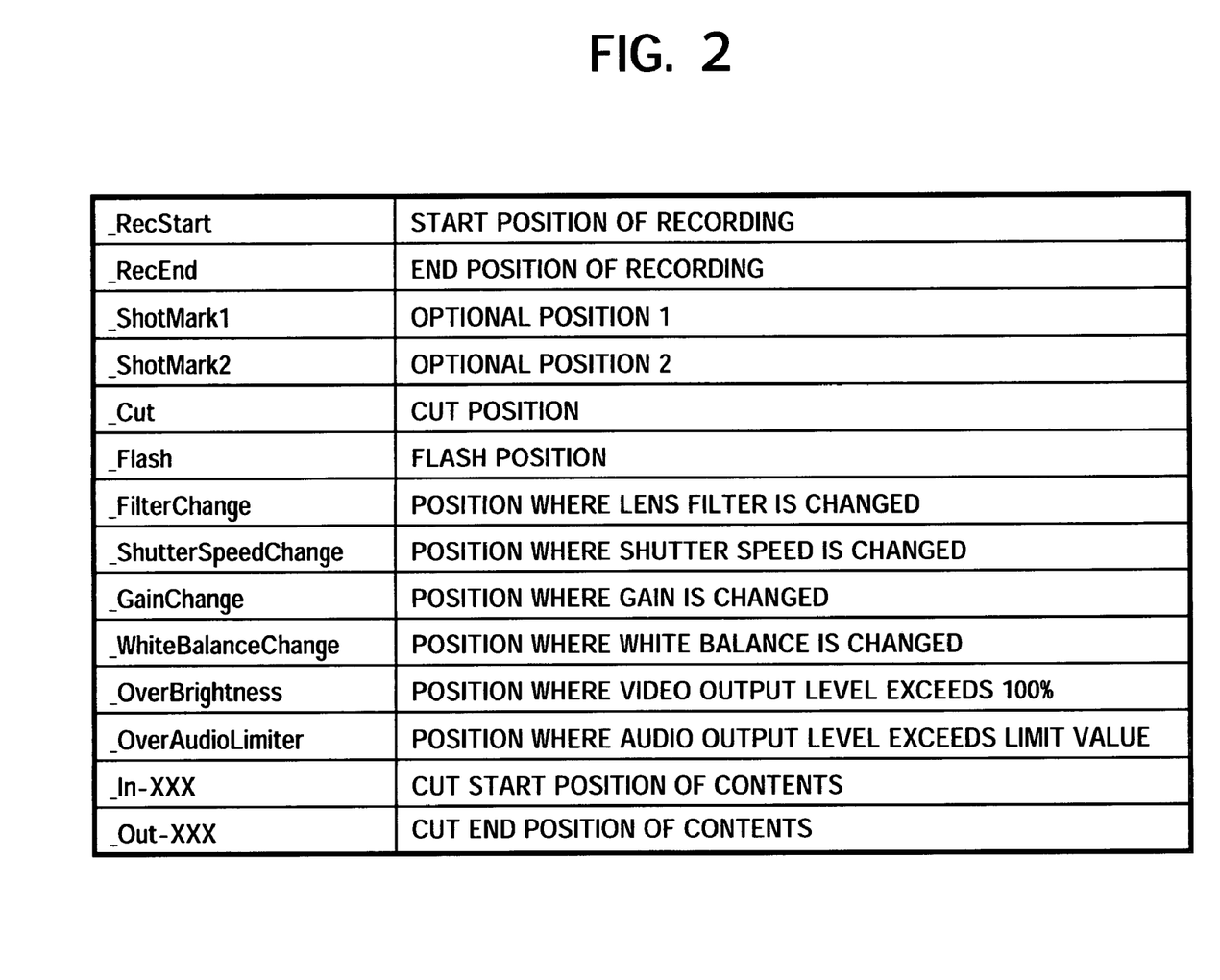
FIG. 2 is a diagram showing an example of reservation words used for defining essence marks.

FIG. 2 is a diagram showing examples of the reservation words used for defining the essence marks. Note that FIG. 2 shows examples. It is also possible to further additionally define other essence marks.

"_RecStart" is a capture start mark indicating the start position of the recording. "_RecEnd" is a capture end mark indicating an end position of the recording. "_ShotMark1" and "_ShotMark2" are shot marks indicating any positions of points of time to be noted etc. "_Cut" is a cut mark indicating a cut position. "_Flash" is a flash mark indicating a flash detection position where a flash position was detected. "_FilterChange" is a filter change mark indicating a position where a lens filter is changed in the camera device. "_ShutterSpeedChange" is a shutter speed change mark indicating a position where the shutter speed is changed in the camera device. "_GainChange" is a gain change mark indicating a position where the gain of the filter etc. is changed. "_WhiteBalanceChange" is a white balance change mark indicating a position where the white balance is changed. "_OverBrightness" is a mark indicating a position where the output level of a video signal exceeds a limit value. "_OverAudioLimiter" is a large volume mark indicating a position where the output level of the audio signal exceeds the limit value.

The marks explained above are recorded linked with frame counts of the video data.

"_In-XXX" is an editing start mark indicating the cut or cut start position of the contents. "_Out-XXX" is an editing end mark indicating the cut or cut ending position of the contents. In the editing start mark and the editing end mark, numerals, letters, etc. are assigned to parts of "XXX" in order whenever the editing start point (IN point) and the editing end point (OUT point) are added. For example, they become like "_In-001", "_In-002", . . . .

Note that, in FIG. 2, essence marks depending upon the camera function, for example "_Flash", "_ShutterSpeedChange", and "_WhiteBalanceChange" are generated on the optical disk device 2 side and entered in the meta-data file.

In FIG. 2, essence marks for the video editing, for example "_ShotMark1", "_ShotMark2", "_In-XXX", and "_OutXXX" are input on the computer 3 side and entered in the meta-data file.

By using the essence marks defined as explained above as indexes at the time of the rough editing, it becomes possible to efficiently select video scenes in accordance with the objective.

[Configuration of Optical Disk Device 2]

Next, an explanation will be given of the configuration of the optical disk device 2 with reference to FIG. 3.

Figure 3:
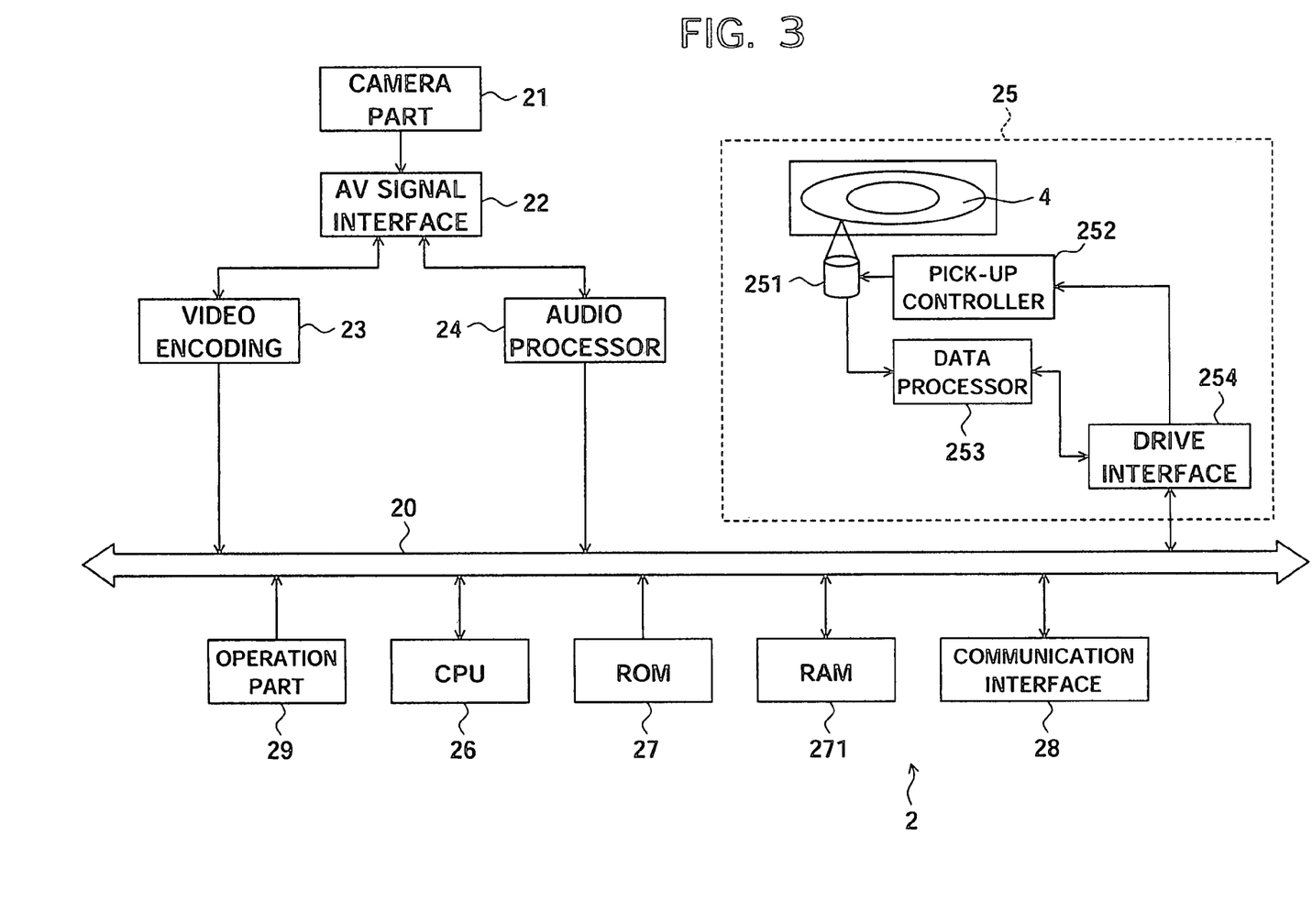
FIG. 3 is a block diagram showing the configuration of an optical disk device according to an embodiment of the present invention.

FIG. 3 is a block diagram showing the configuration of the optical disk device 2.

In FIG. 3, a camera part 21 includes a camera for shooting the video content, an LCD for monitoring the video, and a camera adjustment mechanism. The camera part 21 generates an AV signal in which a video signal and an audio signal are multiplexed and supplies it to an AV signal interface 22. For example, in response to the input of an operation part 29, the recording of the video content is started and ended to generate one clip of the AV signal. Note that a continuous video section from the start of one recording operation up to the end of the recording is referred to as "one clip". In the optical disk device 2, the AV data, the proxy AV data, etc. are managed in parts of clips, and the files are generated in parts of clips.

Further, the camera part 21 for example adjusts the white balance and operates the flash etc. in response to input of the operation part 29.

The AV signal interface 22 outputs the video signal supplied from the camera part 21 to the video encoding part 23 and outputs the audio signal to the audio processor 24.

The video encoding part 23 digitally converts the supplied video signal according to need, then compression encodes it by for example an MPEG (Moving Picture Experts Group) 2 method and outputs the obtained data via a predetermined interface circuit to a bus 20.

The audio processor 24 converts the audio signal supplied from the AV signal interface 22 from an analog to digital format and outputs the obtained data via a predetermined interface circuit to the bus 20.

A drive 25 is configured by a pick-up controller 252 for controlling emission a laser beam from the pick-up and detection of reflected light thereof, a data processor 252 for outputting the data to be recorded on the optical disk 4 to the pick-up 251 and acquiring data from the reflected light of the laser beam detected at the pick-up 251, and a drive interface 254 for transferring data between the data processor 253 and the bus 29.

Note that the drive 25 has a loading function of the optical disk, but the function block is omitted in FIG. 3.

A CPU 26 loads a control program recorded in a ROM 27 in a RAM 271 to control the overall operation of the optical disk device 2. For example, the CPU 26 controls the parts of the drive 25 when the optical disk 4 is loaded in the drive 25.

The CPU 26 multiplexes output data of the video encoding part 23 and the audio processor 24 to generate the AV data and the proxy AV data. At that time, it controls the video encoding part 23 so as to compression encode the proxy AV data by a lower bit rate than the AV data.

The generated proxy AV data is transmitted via the communication interface 28 to the computer 3 for example for every 2 second packet.

Figure 4:
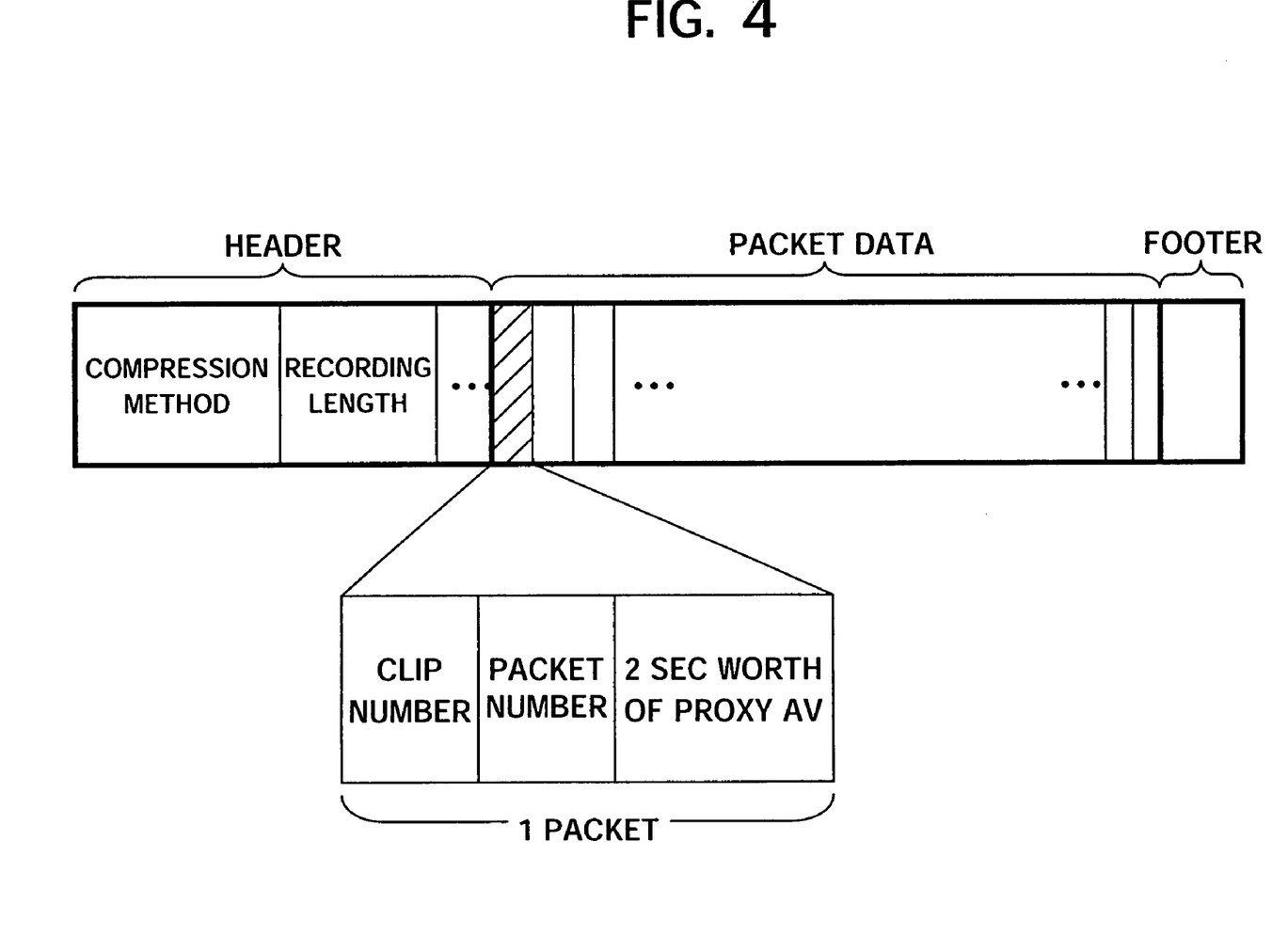
FIG. 4 is a diagram illustrating the data configuration of a proxy AV data file.

The CPU 26 controls the drive 25 to record 1 clip's worth of the proxy AV data as the proxy AV data file on the optical disk 4. As shown in FIG. 4, the proxy AV data file is comprised of a proxy header (hereinafter, referred to as "a header"), packet data, and a footer.

The header includes data in which the compression method of the proxy AV data is described and also recording length data. Accordingly, the content of the header is decided at the end of the recording.

The packet data includes a plurality of packets each including the proxy AV data for 2 seconds. Each packet includes, other than the proxy AV data for 2 seconds, a clip number for specifying the clip and a packet number for specifying the packet. The clip number is set in accordance with the UNID of the corresponding clip and is a unique number different for each clip. The packet numbers become continuous numbers for packets sequentially transmitted from the start of the recording (for example "C0001", "C0002", · · · ).

The footer includes a code indicating the end of the proxy AV data.

Note that the optical disk device 2 transmits the header and the meta-data file explained later to the computer 3 after the end of the shooting one clip in response to a request from the computer 3.

When for example adjusting the white balance, operating the flash, and otherwise adjusting the camera, the CPU 25 extracts the corresponding essence mark EM and describes it in a meta-data file MDF1 related to the frame count at the time of that camera adjustment. Namely, the position of one clip of the video content and the essence mark set corresponding to the position are described in the meta-data file MDF1 linked together. Then, one clip's worth of the meta-data file MDF1 is recorded on the optical disk 4.

Note that, as will be explained later, the meta-data file MDF1 on the optical disk 4 is rewritten to a meta-data file MDF3 after receiving the meta-data file MDF3 from the computer 3.

The CPU 26 generates a status STS as data indicating the operation state of the optical disk device 2. Then, in response to a request from the computer 3, it returns the status STS. The status STS includes "REC" indicating recording is in progress, "PLAY" indicating reproduction is in progress, and -STOPS (or "PAUSE") indicating the operation is stopped. For example, when the recording is started in the status of "STOP", the status changes from "STOP" to "REC". Further, when the recording is ended, the status changes from "REC" to "STOP".

When a new clip of the AV data begins to be generated by the recording start operation, the CPU 26 generates the corresponding clip data. The clip data includes a clip number, a frame rate, and UMID. The optical disk device 2 transmits the clip data to the computer 3 in response to the request from the computer 3.

[Configuration of Computer 3]

Next, an explanation will be given of the configuration of the computer 3.

Figure 5:
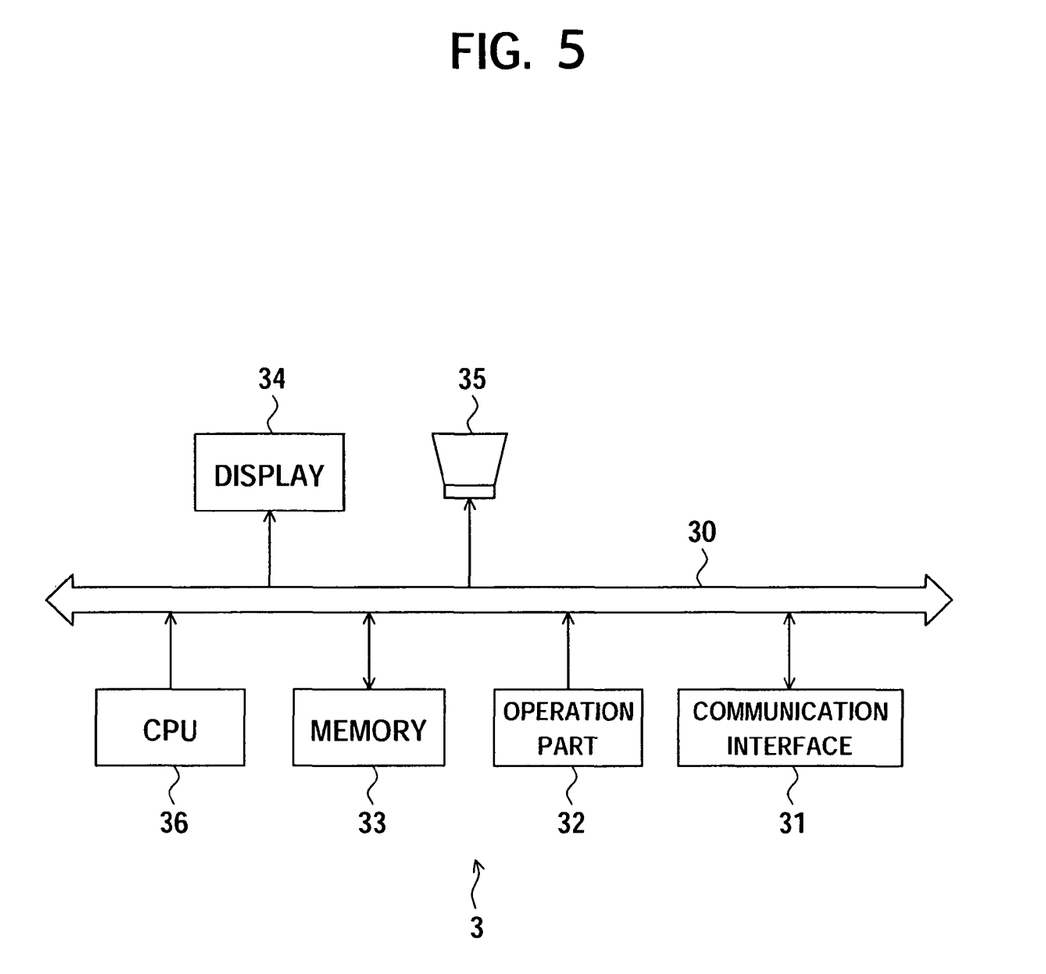
FIG. 5 is a block diagram showing the configuration of a personal computer according to an embodiment of the present invention.

To computer 3 is transmitted the multiplexed proxy AV data from the optical disk device 2 in parts of packets. The computer 3 streaming reproduces (outputs video and outputs audio of) the received proxy AV data and can input an essence mark as index information to a desired position of the proxy AV data. Then, the input essence mark is described in the meta-data file and a thumbnail image corresponding to the input position of the essence mark is displayed.

As shown in FIG. 5, the computer 3 is configured by a communication interface 31, an operation part 32, a memory 33, a display 34, a speaker 35, and a CPU 36.

The communication interface 31 is configured so as to be able to communicate with the optical disk device 2 according to a predetermined Ethernet protocol. The communication interface 31 receives the status STS, the clip data, and the proxy AV data from the optical disk device 2 during the recording of one clip of the video content. Further, the communication interface 31 receives the header and the meta-data file MDF1 after recording the clip.

The operation part 32 configures a predetermined GUI (Graphical User Interface) in cooperation with the display 34. Namely, the operation part 32 has for example a keyboard. The input of an operation with respect to that keyboard corresponds to the image displayed on the display 34.

The operation part 32 receives the essence mark EM as the input of an operation. Namely, the user operating the computer 3 monitors the reproduced video (live video) of the proxy AV data and inputs the essence marks EM as indexes for the editing work in the later processing.

For example, during the reproduction of the live video of a professional baseball game, by performing a predetermined operation with respect to the operation part 32 at the point of time when a home run occurs, an essence mark EM corresponding to home run is linked with the frame count. Due to this, editing work that generates the AV data of a digest version of the professional baseball game later becomes easy.

Each input essence mark EM is linked to the frame count at the point of time of the input by the CPU 36. Further, the operation part 32 accepts text data (comments) corresponding to the essence mark EM.

The essence mark EM, the frame count (or time code), and the comment are described in a meta-data file MDF2. Then, one clip's worth of the meta-data file MDF2 is recorded in the memory 33.

The CPU 36 requests and acquires the status STS (data indicating the status of the optical disk device 2) generated by the optical disk device 2 from the optical disk device 2 for example every second via the communication interface 31. Namely, the CPU 32 detects every second whether the optical disk device 2 is presently recording ("REC"), reproducing ("PLAY"), or at a stop ("STOP").

The CPU 36 sequentially streaming reproduces the proxy AV data acquired from the computer 3. Namely, it decodes the proxy AV data, sequentially displays video obtained by the decoding in the display 34, and outputs the audio obtained by the decoding to the speaker 35.

The CPU 36 records one clip's worth of the proxy AV data acquired from the optical disk device 2 in the memory 33 linked to the clip data. Namely, it manages the proxy AV data for each clip. Then, the CPU 36 adds a footer to the tail of the proxy AV data at the time of the end of the recording by the optical disk device 2 and adds the header acquired from the optical disk device 2 after the end of the recording to the header of the proxy AV data to generate the proxy AV data file.

The CPU 36 acquires the meta-data file MDF1 from the optical disk device 2 after the end of the recording of one clip, merges it with a meta-data file MDF2 generated in the inside to generate the meta-data file MDF3, and stores this in the memory 33.

The merging of meta-data files is carried out as follows.

When the frame counts linked with the essence marks EM are different between the meta-data file MDF2 and the meta-data file MDF1, they are merged as they are.

When essence marks EM in the meta-data files MDF2 and MDF1 are linked with the same frame count, the frame count corresponding to the essence mark EM of one of them (for example MDF1) is shifted (for example increased) by for example one. Namely, after the merging, processing is carried out so that there is only one corresponding essence mark EM for each of the frame counts.

Then, the CPU 36 transmits the meta-data file MDF3 obtained by the merging to the optical disk device 2. Due to this, the optical disk device 2 and the computer 3 can manage clips by the common meta-data file MDF3.

The display 34 performs the video reproduction of the transmitted proxy AV data, the display in response to the input of the essence marks, etc. according to a predetermined GUI in cooperation with the operation part 32.

An example of the GUI of the display 34 will be explained later.

[GUI of Computer 3]

Next, an explanation will be given of the GUI of the computer 3.

Figure 6:
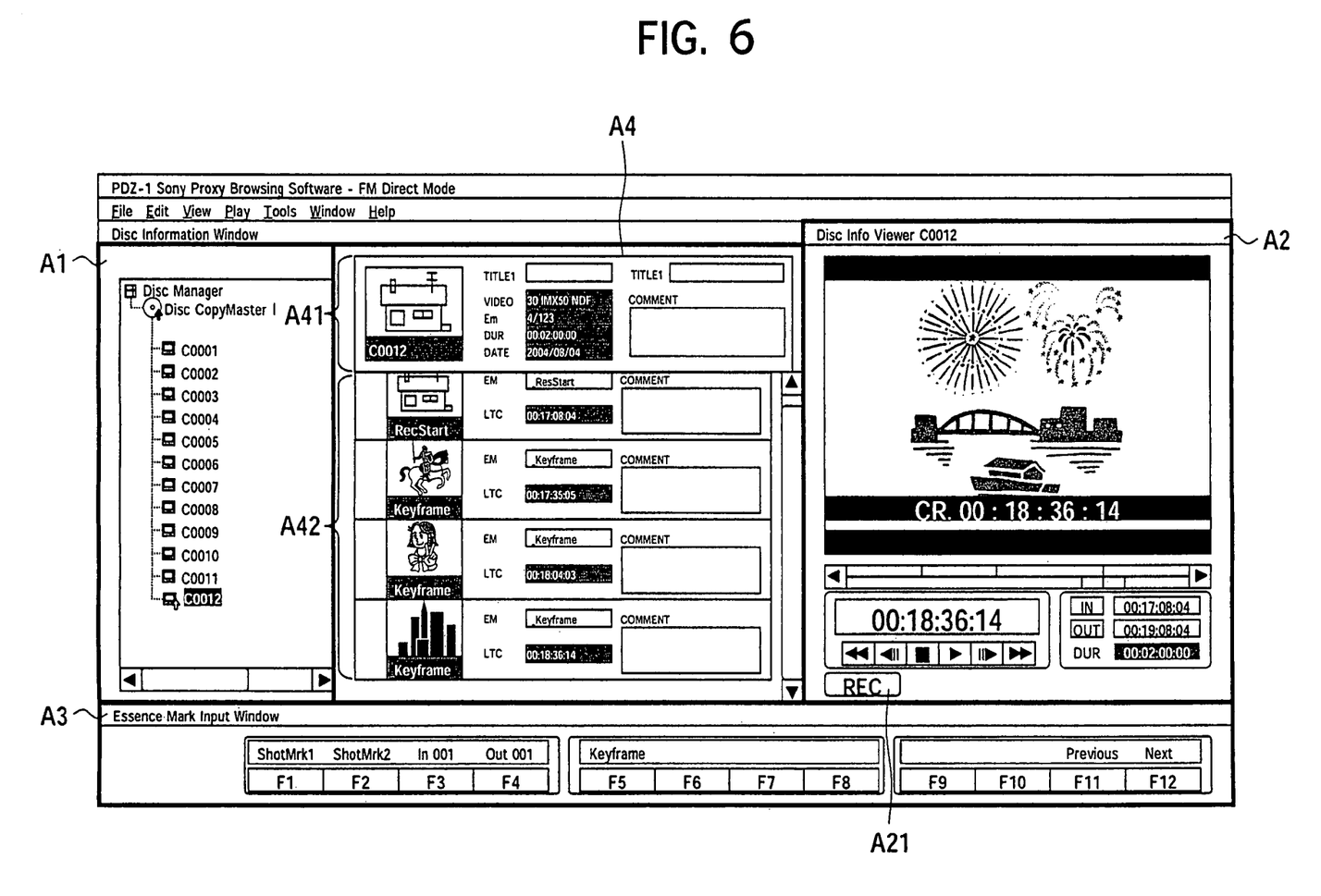
FIG. 6 is a diagram showing a displayed image of a display of the computer according to an embodiment of the present invention.

FIG. 6 is a diagram showing a displayed image of the display 34 of the computer 3. As shown in the diagram, the display 34 is configured by schematically four display areas A1 to A4. Note that FIG. 6 shows an example of display where the optical disk device 2 is recording.

The display area A1 is an area for displaying a file management state in parts of clips based on the disk data and the clip data. In FIG. 6, "C0001" to "C0011" indicate clip numbers of already recorded proxy AV data files in the memory 33. Further, in FIG. 6, in order to emphasize the fact that proxy AV data having a clip number of "C0012" is being received, in the display area Al, "C0012" is displayed by a display method different from the clip of the other clip numbers.

The display area A2 is an area for displaying the video (live video) of the proxy AV data being received. In the display area A2, other than the live video, the time information and the detection result of the status STS (for example "REC" in an area A21 on the left bottom end of the display area A2) are displayed.

The display area A3 is an area for displaying the correspondence between the function keys of the operation part 32 and texts (EM names) corresponding to the essence marks. For example, the EM name "ShotMrk1" corresponding to the essence mark "_ShotMark1" (see FIG. 2) is displayed corresponding to the function key F1. The user operating the computer 3 depresses the function key at the desired position of the live video, whereby the corresponding essence mark EM is input. The input essence mark is described in the meta-data file MDF2.

The display area A4 is an area for displaying a thumbnail image corresponding to the input essence mark EM. When the essence mark EM is input by the depression of the function key, the image displayed in the display area A2 at the time of the input is converted to a bit map format, and as shown in FIG. 6, a thumbnail image area including a bit map image (thumbnail image), an essence mark, a comment, etc. is generated and displayed. Note that a comment column of the thumbnail image area always receives text input after the thumbnail image area is generated.

The thumbnail image area displays the time code (LTC) by adding the frame count linked with the essence mark EM to the clip start time.

In FIG. 6, the proxy AV data of the clip having the clip number of "C0012" is reproduced. In for example the display area A42, a plurality of thumbnail image areas of the clip are displayed so that scrolling is possible. Further, in the display area A41, property information (for example, title, date, and a thumbnail image at the time of the recording start) of the clip which has become active in the display area Al (in the figure, the clip of "C0012" ) is displayed.

The computer 3 has the GUI as explained above, therefore, the user can monitor the video content during recording in real time as the live video and can input essence marks EM which become necessary for the later editing work to the desired positions of the live video. Further, memos can be input to the comment column of the thumbnail image area. This is useful for the later editing work.

[Operation of Contents Recording System 1]

Next, an explanation will be given of the operation of the contents recording system 1.

Figure 7:
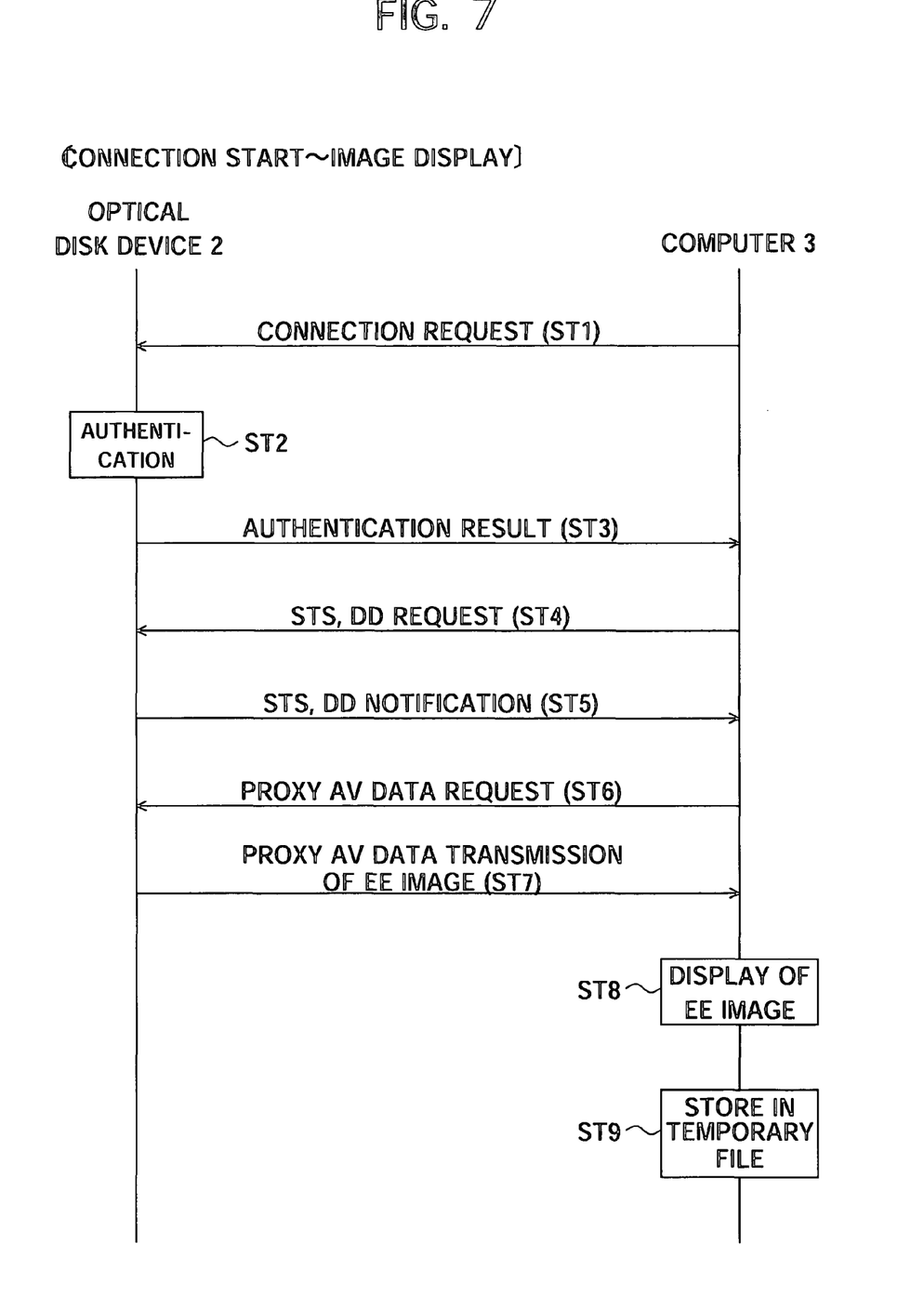
FIG. 7 is a flow chart for explaining an operation of a contents recording system according to an embodiment of the present invention.

(1) Start of Network Connection to Video Display (see FIG. 7)

First, in order to establish communication between the optical disk device 2 and the computer 3, connection is requested from the computer 3 to the optical disk device 2 (step ST1). For example, the computer 3 is configured so as to accept the input of a user name and a password. In the optical disk device 2, an authentication operation is carried out based on the input content (step ST2). Then, the optical disk device 2 notifies the authentication result to the computer 3 (step ST3). When the authentication succeeds, the processing of step ST4 and following steps are carried out.

Note that, in FIG. 7, it is assumed that the status STS of the optical disk device 2 is "STOP", that is, the operation is stopped, and video is not being recorded.

At step ST4, the computer 3 requests the status STS and the disk data DD (step ST4). Here, the disk data DD includes an ID (disc ID) unique to the optical disk loaded in the optical disk device 2. In response to these requests, the computer 3 receives the status STS and the disc data DD from the optical disk device 2 (step ST5).

Note that, although not shown, hereinafter, the computer 3 requests the status STS with respect to the optical disk device 2 and acquires the status STS periodically, for example for every second.

Next, the computer 3 requests the proxy AV data (step ST6). In response to that request, the optical disk device 2 transmits the proxy AV data of an EE (Electric to Electric) image (step ST7). Namely, the optical disk device 2 is at a stop, therefore does not record the acquired video, but only transmits it as it is to the computer 3. Then, the computer 3 streaming reproduces the received proxy AV data (step ST8). Namely, it decodes the proxy AV data, sequentially displays the video obtained by the decoding in the display 34, and outputs the audio obtained by the decoding to the speaker 35.

Note that the time when the recording is started at the optical disk device 2 side depends upon the timing of operation by the user of the optical disk device 2 and cannot be predicted in advance. On the other hand, it is very difficult to constantly store the proxy AV data of the EE image for the start of recording when considering the limited storage capacity of the memory 33.

Accordingly, in the computer 3, a temporary proxy AV data file able to write for example 30 packets (one packet is 2 seconds, worth of the proxy AV data) is provided. Then, the proxy AV data of 1 minute is stored in the temporary proxy AV data file (step ST9). Before that 1 minute passes, a new temporary proxy AV data file is generated. The proxy AV data of the next one minute is stored in this new temporary proxy AV data file, and the previous temporary proxy AV data file is deleted. Such processing is repeatedly carried out.

Due to this, the increase of the data of the proxy AV data of the EE image stored by the computer 3 is prevented. Further, at least one packet's worth of the proxy AV data is always stored, therefore, even in a case where the status change to "REC" is detected at any time, the proxy AV data immediately after the start of recording will not be lost.

Figure 8:
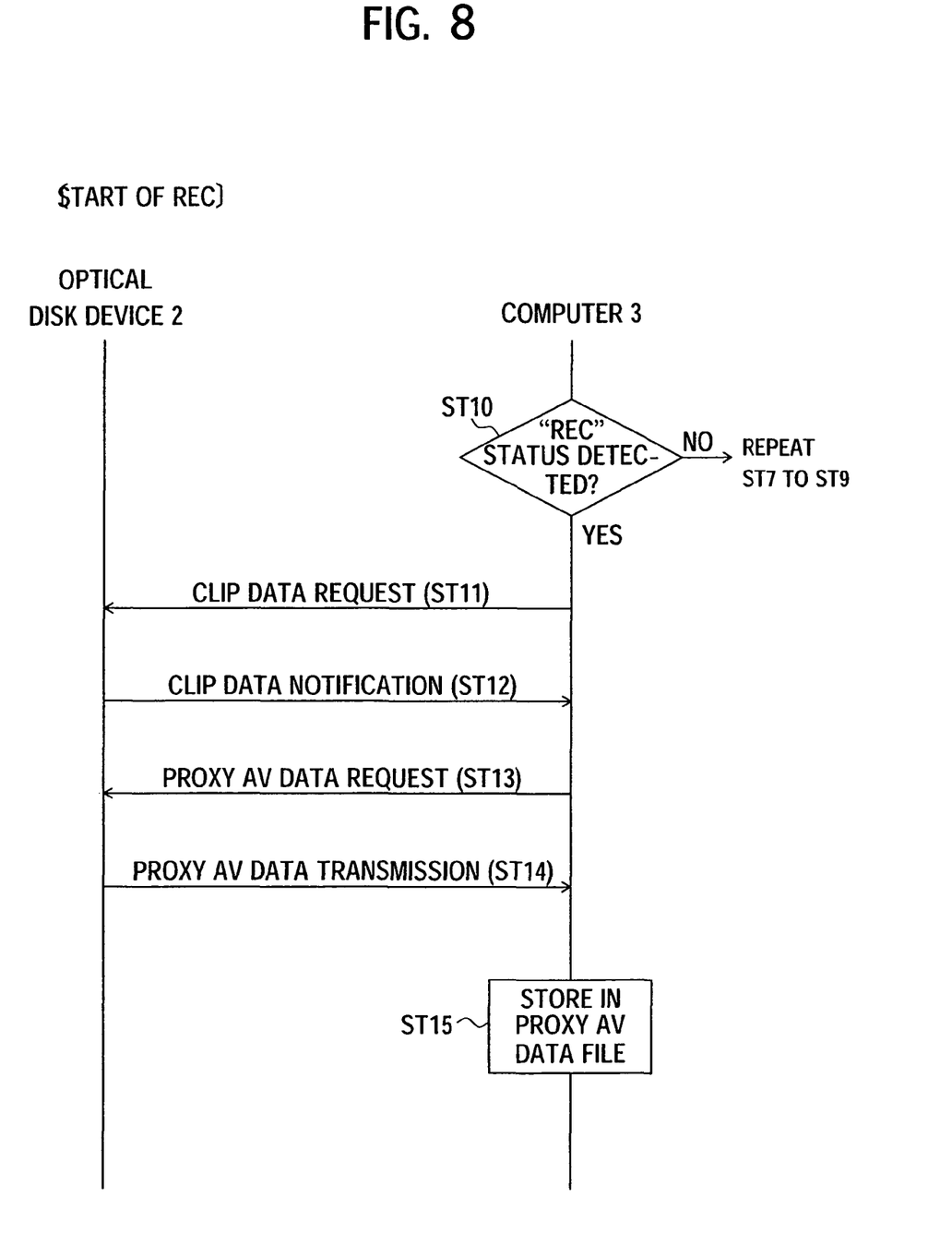
FIG. 8 is a flow chart for explaining an operation of a contents recording system according to an embodiment of the present invention.

(2) Start of Recording (see FIG. 8)

Next, when the optical disk device 2 starts the recording in response to input of an operation by the user of the optical disk device 2, the optical disk device 2 changes the status STS from "STOP" to "REC". The computer 3 requests the status STS every second and soon detects this status change (step ST10). The detection result is displayed on the display 34 of the computer 3 so that the user can recognize it.

Then, the computer 3 requests the clip data of the AV data being recorded from the optical disk device 2 (step ST11). The optical disk device 2 manages the AV data being recording by the clip number corresponding to the UMID and transmits the clip data including this clip number to the computer 3 (step ST12). Due to this, the optical disk device 2 and the computer 3 can manage a file related to a common clip number.

The computer 3 prepares the proxy AV data file linked with the clip number included in the received clip data. Then, the computer 3 requests the proxy AV data (step ST13) and receives the proxy AV data in parts of packets (step ST14).

The received proxy AV data is sequentially stored in the prepared proxy AV data file (step ST15).

Figure 9:
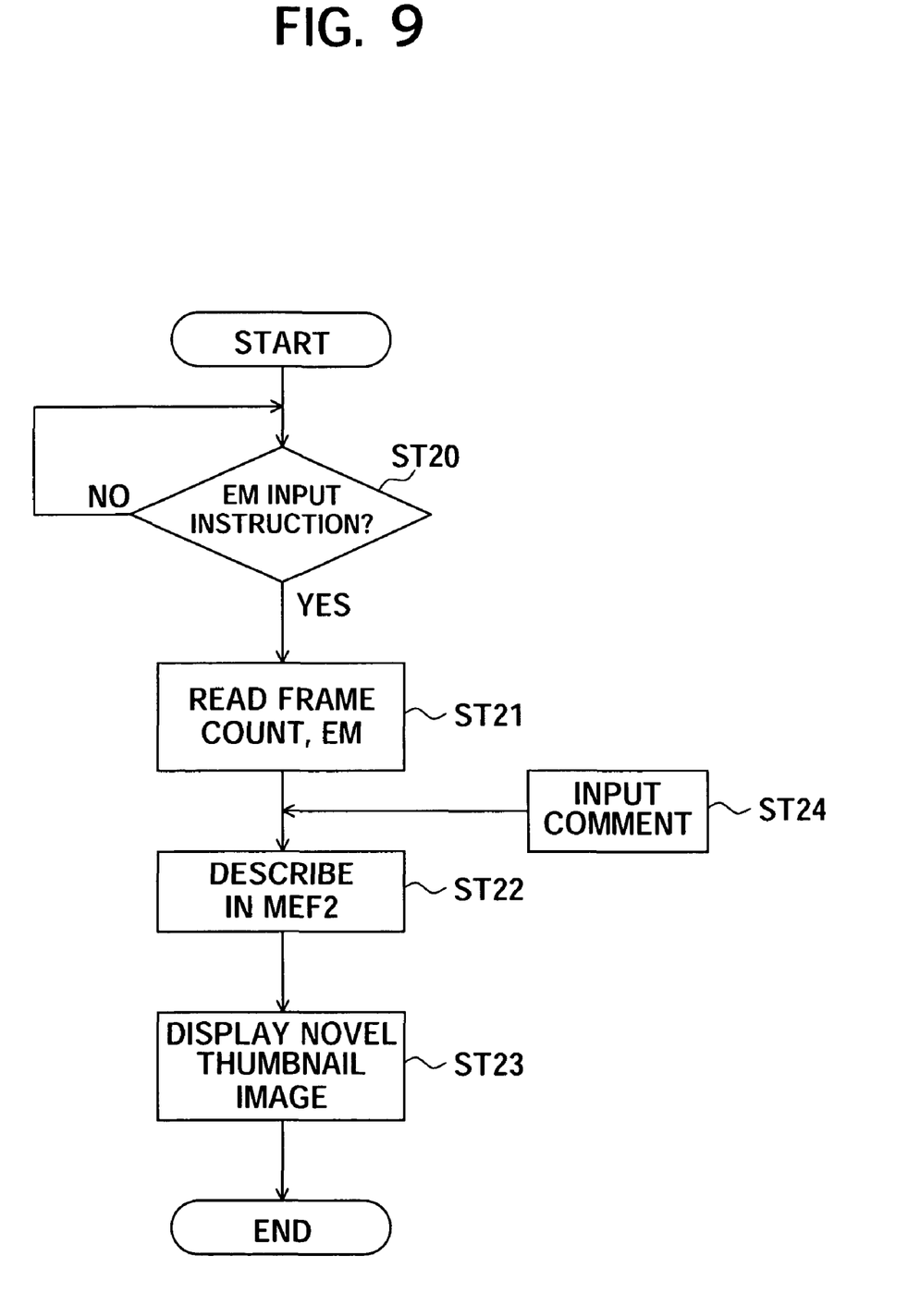
FIG. 9 is a flow chart for explaining an operation of a contents recording system according to an embodiment of the present invention.

(3) Input of Essence Mark EM (see FIG. 9)

During the recording and the streaming reproduction in the computer 3, an essence mark is received via the operation part 32 and described in the meta-data file MDF2.

The text (EM name) corresponding to the essence mark EM is previously set and registered in the memory 33 linked with for example a function key of the operation part 32. Then, when detecting input with respect to the function key (step ST20), the CPU 36 reads out the essence mark EM corresponding to that input from the memory 33 and extracts the frame count of the video at the point of time when the input is detected (step ST21).

Further, the operation part 32 accepts input of comments (step ST24). Not limited to the timing between steps ST21 and ST22 as illustrated, this comment input is accepted at any time according to need.

The essence mark EM, the frame count, and the comment are described in the meta-data file MDF2 linked together (step ST22).

Further, the image reproduced on the display 34 at the point of time when input with respect to a function key is detected is converted to image data in the bit map format to generate a thumbnail image and displayed (step ST23). As previously explained, the input of the comment is possible even after generating the thumbnail image.

Figure 10:
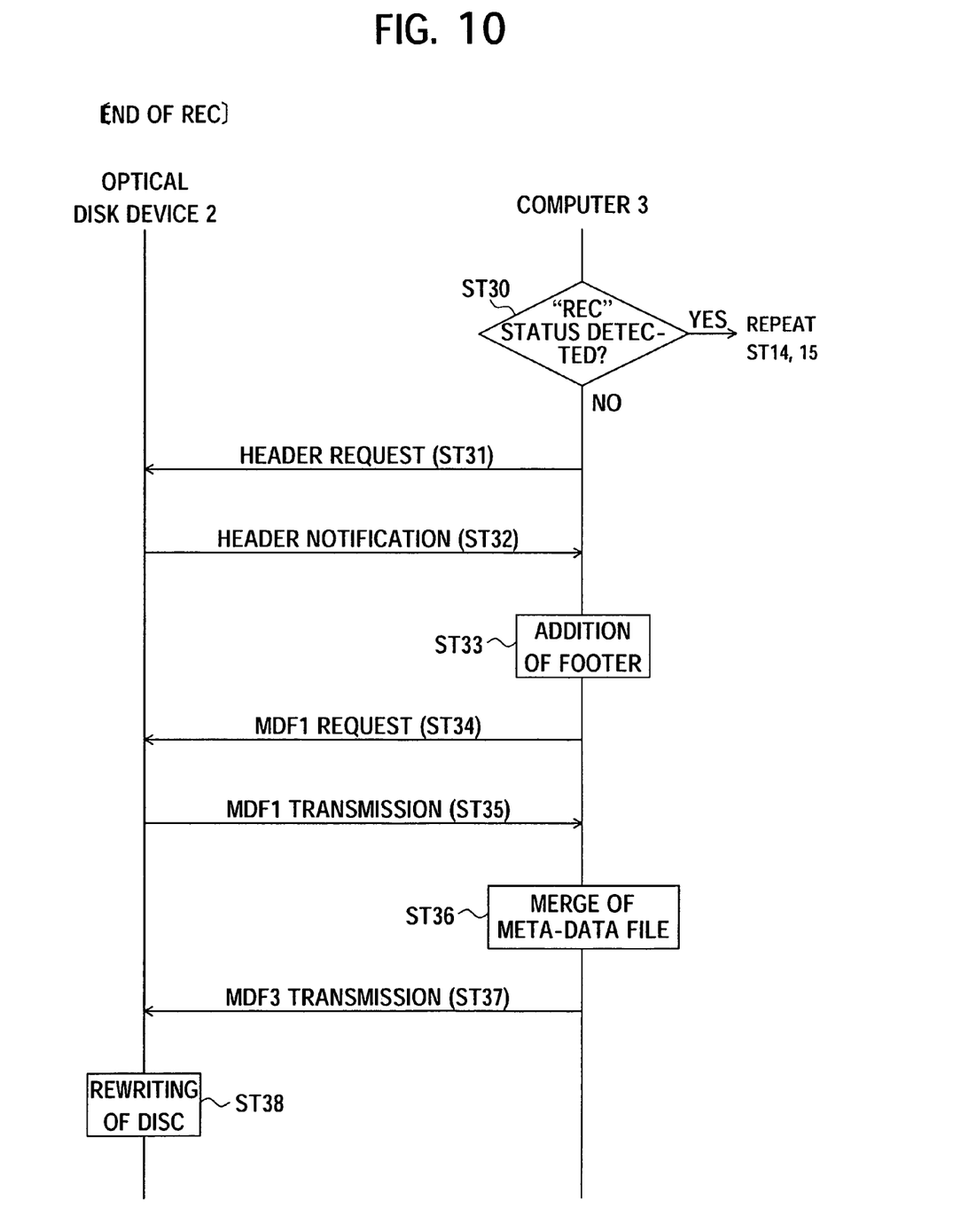
FIG. 10 is a flow chart for explaining an operation of a contents recording system according to an embodiment of the present invention.

(4) End of Recording (see FIG. 10)

Next, when the optical disk device 2 ends the recording along with input of an operation of the user with respect to the optical disk device 2, the optical disk device 2 changes the status STS from "REC" to "STOP". The computer 3 requests the status STS every second and detects this status change in a short time (step ST30).

When the recording of one clip ends, the optical disk device 2 writes the recording length (recording period) data of that clip into the header. Due to this, the header is completed.

After detecting the status change, the computer 3 requests the header (step ST31) and receives the completed header (step ST32). The computer 3 adds the acquired header to the header of the proxy AV data file and adds the footer (predetermined code indicating the end position) to the tail of the proxy AV data stored in the proxy AV data file. By this processing, the proxy AV data file is completed in the computer 3.

Next, the computer 3 requests the meta-data file MDF1 generated in the optical disk device 2 from the optical disk device 2 (step ST34) and acquires it (step ST35).

Further, the computer 3 merges the meta-data file MDF2 and the meta-data file MDF1 to generate the meta-data file MDF3 (step ST36).

The meta-data file MDF3 generated by the merger is transmitted to the optical disk device 2 (step ST37). Then, the optical disk device 2 rewrites the meta-data file MDF1 on the optical disk to the acquired meta-data file MDF3 (step ST38). Due to this, the user of the optical disk device 2 interprets the meta-data file to which the essence mark EM input with respect to the computer 3 is added and becomes able to edit the AV data (main data).

Figure 11:
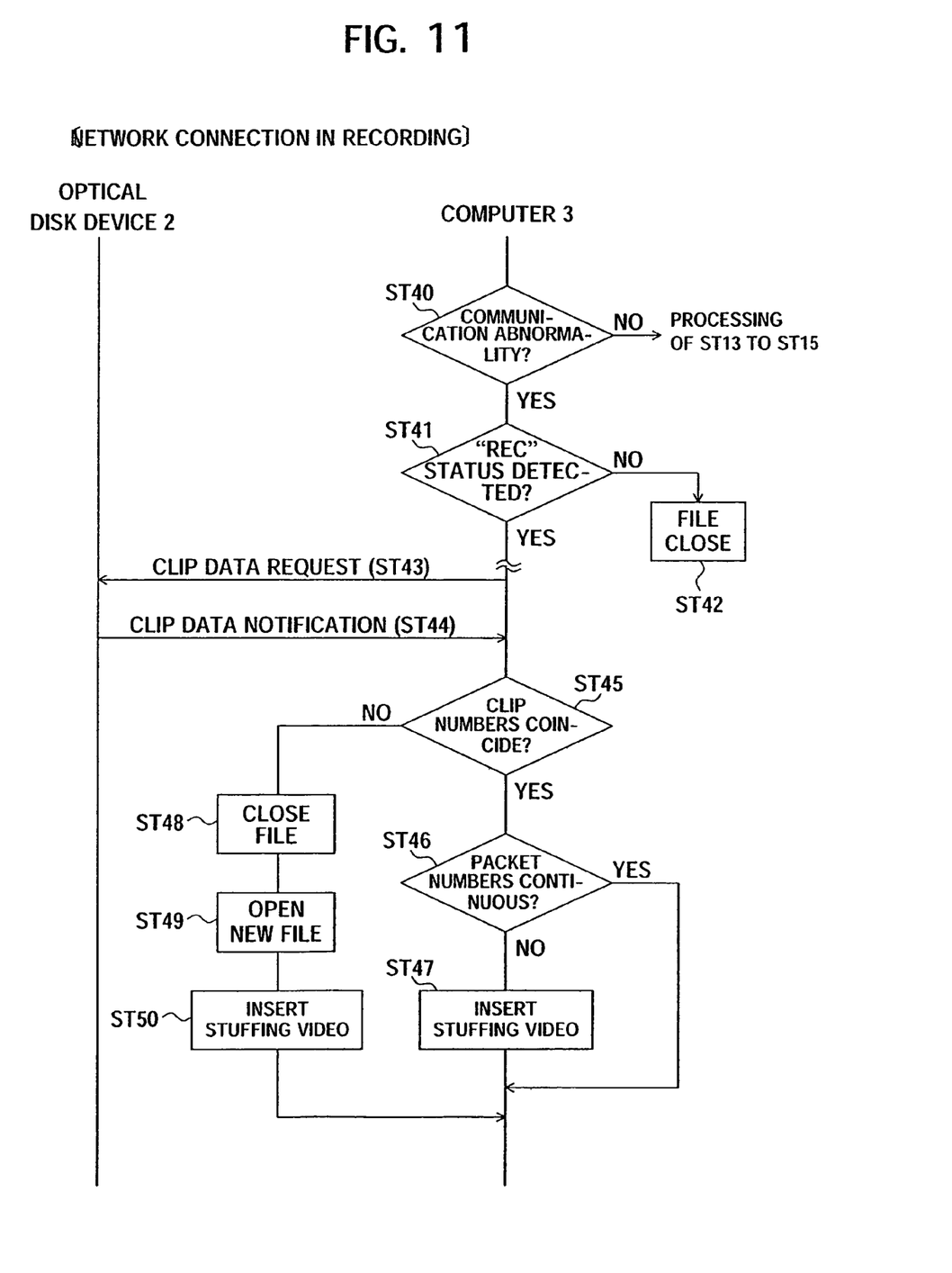
FIG. 11 is a flow chart for explaining the operation at the time of a communication abnormality of the contents recording system according to an embodiment of the present invention.

(5) Communication Interruption Processing (see FIG. 11)

Next, an explanation will be given of the processing in the case where a communication abnormality occurs between the optical disk device 2 and the computer 3 due to trouble etc. of the network. A communication abnormality becomes a problem when the optical disk device 2 is recording the video content.

First, when the communication interface 31 of the computer 3 detects a communication abnormality (step ST40), it is checked whether or not the status STS of the optical disk device 2 is "REC", that is, recording is in progress (step ST41). For example, when there is no response from the optical disk device 2 to a packet request from the computer 3 within a suitable period, it can be judged that there is a communication abnormality.

When the status STS is not "REC" at step ST41, it is decided that a status change (for example from "REC" to "STOP") has occurred during the communication abnormality and the present clip has ended, then the proxy AV data file and the meta-data file MDF2 are closed (step ST42).

When the status STS is "REC" at step ST41, two types of cases can be considered: (i) the case where the optical disk device 2 is recording in the same clip from before when the communication abnormality occurred and (ii) the case where the optical disk device 2 side engaged in a stop operation and recording start operation during the communication abnormality and as a result is recording a different clip from that before the communication abnormality. Accordingly, the computer 3 requests the clip data after the occurrence of the communication abnormality (step ST43), acquires the clip data (step ST44), then performs the processing in accordance with the clip data.

Note that although not shown, the computer 3 starts to receive the proxy AV data after acquiring the clip data.

The CPU 36 of the computer 3 compares the clip number acquired before the occurrence of the communication abnormality and the clip number acquired after the occurrence of the communication abnormality (step ST45) and performs the following processing.

When clip numbers coincide between before and after the occurrence of the communication abnormality, it is checked if packet numbers of the proxy AV data received before and after the occurrence of the communication abnormality are continuous (step ST46). In the reception of proxy AV data of the same clip, packet numbers always continue, therefore, the case where these are not continuous means a loss of the data due to the communication abnormality.

When the packet numbers are not continuous, the difference of packet numbers before and after the occurrence of the communication abnormality is calculated, and a stuffing video of a period corresponding to that difference (="difference value"×2 seconds) is inserted into the proxy AV data (step ST47). Due to this, the timing of the proxy AV data normally recovers, and the problem that a time deviation occurs when the editing is carried out later is avoided.

Note that as the stuffing video, insertion of a black image so as to prevent giving the user a strange feeling is desirable, but the image may also be other than black.

When the clip numbers do not coincide before and after the occurrence of the communication abnormality, it is decided that the clip changed to the next clip during the communication abnormality, the file prepared before the occurrence of the communication abnormality is closed (step ST48), and, based on the new clip data received in step ST44, new files (proxy AV data file, meta-data file) are opened (step ST49).

Further, in such a case, since the initial packet is missing in the new clip, a stuffing video of a period corresponding to the packet number acquired first as a new clip (="packet number"×2 seconds) is inserted into the proxy AV data (step ST50). Due to this, in the same way as step ST47, the timing of the recorded proxy AV data recovers to normal, and the problem that a time deviation occurs when performing the editing later is avoided.

Effects of Embodiment

As explained above, in a contents recording system 1 according to the present embodiment, the optical disk device 2 recording the video content and the computer 3 are connected via a network. The computer 3 is supplied with the low resolution proxy AV data from the optical disk device 2, streaming reproduces the same as live video, introduces an essence mark EM to any position of the proxy AV data, and describes it in the meta-data file MDF2. Then, after the end of the capture of one clip, the computer 3 merges the meta-data file MDF2 and the meta-data file MDF1 generated on the optical disk device 2 side in accordance with the camera adjustment. The meta-data file MDF3 obtained by the merger is transferred to the optical disk device 2, and the meta-data file MDF1 on the optical disk is rewritten. Due to this, the following effects are obtained.

Namely, (1) when a user B (editor) different from the user A (cameraman) operating the optical disk device 2 operates the computer 3, the user A can concentrate on the camera work, and the user B can monitor the camera content in real time and input the essence marks necessary for the editing in real time. Accordingly, the camera work and the rough editing work can be simultaneously advanced, and, in comparison with the conventional system sequentially performing the camera work and the rough editing work, the work time can be greatly reduced.

(2) In the conventional system, in the rough editing work, the editor noted the time code of the desired video scene and any comments in a memo while reproducing the recorded video content, but when using the contents recording system 1 according to the present embodiment, he can directly input the essence mark and the comment to the computer 3 during the recording of the video content, so the editing efficiency is remarkably improved.

Further, in the contents recording system 1 according to the present embodiment, after the end of shooting of one clip, a proxy header describing the recording length is transferred from the optical disk device 2 to the computer 3. Due to this, a proxy AV data file the same as that by the optical disk device 2 for recording the video content can be generated. Accordingly, the editor can quickly transfer the proxy AV data file from the computer 3 to the system etc. of the studio preparing the final broadcast use data via the network. Accordingly, the editing efficiency is remarkably improved.

In the contents recording system 1 according to the present embodiment, during the recording of video content, the optical disk device 2 sequentially transfers to the computer 3 packets each including a predetermined period's worth of the proxy AV data, the clip number, and the packet number. Then, when detecting a communication abnormality, the computer 3 receives the clip data again after the communication recovers to normal conditional on detection of the optical disk device 2 recording. Accordingly, by comparing clip numbers before and after the occurrence of a communication abnormality, suitable processing in accordance with a change of the recording operation of the optical disk device 2 becomes possible.

For example, the computer 3 inserts a stuffing video (for example, black image) into the received proxy AV data based on a change of the clip number and the packet number. Accordingly, even in the case where a communication abnormality occurs, no time deviation occurs between the proxy AV data and the AV data (main data), so this does not obstruct the editing work.

Note that the present invention is not limited to the above embodiment. Various modifications of the present invention are possible by a person skilled in the art within a range not changing the gist of the present invention.

For example, in the above embodiment, the proxy AV data is data having a low resolution compression encoded with a low bit rate in comparison with the AV data (main data), but the invention is not limited to this. It may be data having a smaller amount of information than the AV data considering the communication capacity between the optical disk device 2 and the computer 3 and the processing capability of the computer 3. Further, future increases in the communication capacity and striking improvements in the processing capability of the computer 3 should enable transfer of the AV data (main data) to the computer 3 as it is.

Further, in the explanation of the above embodiment, the computer 3 preferably reproduced the proxy AV data generated in the optical disk device 2 in real time, but there is the effect that the editing efficiency is improved even in the case where the data is reproduced along with a time lag in accordance with the communication capacity and the processing capability of the computer 3. Namely, if starting the transfer of the proxy AV data of the already recorded video content before the optical disk device 2 ends the recording of the video content and having the computer 3 reproduce the transferred proxy AV data and input the essence marks in the computer 3, the camera work and the rough editing work can be performed overlapping in terms of time and the editing efficiency can be improved.

It should be understood by those skilled in the art that various modifications, combinations, sub-combinations and alterations may occur depending on design requirements and other factors insofar as they are within the scope of the appended claims or the equivalents thereof.

What we claim is:

1. A contents recording system having a first processing part transmitting video contents and a second processing part receiving the video contents, wherein
   the first processing part is provided with
      a recording part recording video contents in parts of a start of recording to an end of recording and managing the video contents by unique contents IDs, and
      a transmitting part starting transmission to the second processing part in the order of recording the video contents before the recording part ends the recording of one video contents,
   the second processing part is provided with
      a receiving part receiving the video contents from the first processing part together with the contents IDs,
      a display part displaying the received video contents, and
      an index information processing part introducing to a desired position of the video contents displayed on the display part index information serving as an index of that position of the video and recording that position and index information linked together, wherein
   the second processing part receives the contents IDs again when a communication abnormality occurs between said transmitting part and said receiving part conditional on the communication being restored to normal and the recording part being in the middle of recording being detected, wherein
   said second processing part records video contents in the same file before and after occurrence of a communication abnormality conditional on (a) the first contents ID, received before the occurrence of the communication abnormality, and the second contents ID, received after the occurrence of the communication abnormality, are matching and (b) the packet IDs of the received video contents being consecutive before and after occurrence of the communication abnormality, and wherein said second processing part records in different files the video contents received before and after occurrence of a communication abnormality conditional on the first and second contents IDs not matching.

2. A contents recording system as set forth in claim 1, wherein said first processing part divides the video contents into a plurality of video contents for each predetermined period and transmits it in packet parts given consecutive packet IDs.

3. A contents recording system as set forth in claim 2, wherein said second processing part inserts a stuffing video of a period corresponding to a difference of packet IDs before and after occurrence of a communication abnormality conditional on the first and second contents IDs matching and the packet IDs of the received video contents not being consecutive before and after occurrence of the communication abnormality.

4. A contents recording system as set forth in claim 1, wherein said second processing part inserts a stuffing video of a period corresponding to the packet ID of the video contents received after the occurrence of a communication abnormality.

5. A contents recording method performed between a first processing system including a camera and a second processing system including an editing device, including having the first processing system
  start recording of video contents linked with unique contents IDs, and
  start transmission of the video contents to the second processing system in the order of recording before ending the recording of the video contents and
having the second processing system
  receive the video contents together with the corresponding contents IDs,
  display the received video contents,
  introduce to a desired position of the video contents to be displayed index information serving as an index of that position of the video,
  detect whether the first processing system is in the middle of recording the video contents, and
  receive the contents ID again when a communication abnormality occurs between said transmitting part and said receiving part conditional on the communication being restored to normal and the recording part being in the middle of recording being detected, and record video contents in the same file before and after occurrence of a communication abnormality conditional on (a) the first contents ID, received before the occurrence of the communication abnormality, and the second contents ID, received after the occurrence of the communication abnormality, are matching and (b) the packet IDs of the received video contents being consecutive before and after occurrence of the communication abnormality, and record in different files the video contents received before and after occurrence of a communication abnormality conditional on the first and second contents IDs not matching.

6. A contents processing system for processing video contents transmitted from a contents transmitting system, comprising:

a receiving part receiving video contents transmitted from a transmitting part of said contents transmitting system together with unique contents IDs for managing the video contents, a detecting part detecting if the recording part of said contents transmitting part is in the middle of recording video contents, an index information processing part introducing to a desired position of said video contents displayed on a display part an index information serving as an index of that position of the video and recording the positions and index information linked together, and a control part controlling so as to receive the contents ID again when a communication abnormality occurs between said transmitting part and said receiving part conditional on the communication being restored to normal and the recording part being in the middle of recording being detected, wherein video contents being recorded in the same file before and after occurrence of a communication abnormality conditional on (a) the first contents ID, received before the occurrence of the communication abnormality, and the second contents ID, received after the occurrence of the communication abnormality, are matching and (b) the packet IDs of the received video contents being consecutive before and after occurrence of the communication abnormality, and wherein the video contents being recorded in different files when received before and after occurrence of a communication abnormality conditional on the first and second contents IDs not matching.

* * * * *